United States Patent [19]

Sato et al.

[11] Patent Number: 4,940,176

[45] Date of Patent: Jul. 10, 1990

[54] APPARATUS FOR CUTTING WORKPIECES OF GLASS, CERAMICS, AND LIKE MATERIAL

[76] Inventors: Yasuo Sato, 9-8, Kami-Takaido 2-Chome, Suginami-Ku, Tokyo-To; Kunio Saeki, 18-7, Higashi-Tamagawagakuen 1-Chome, Machida-Shi, Tokyo-To, both of Japan

[21] Appl. No.: 207,166

[22] Filed: Jun. 15, 1988

[30] Foreign Application Priority Data

Mar. 29, 1988 [JP] Japan ................................. 63-75077

[51] Int. Cl.$^5$ ............................................ C03B 33/03
[52] U.S. Cl. ..................................... 225/96.5; 225/103
[58] Field of Search .................... 225/93, 96, 96.5, 103

[56] References Cited

U.S. PATENT DOCUMENTS

| 3,542,266 | 11/1970 | Woelfle | 225/2 |
|---|---|---|---|
| 3,559,855 | 2/1971 | Barnett et al. | 225/96.5 |
| 3,578,227 | 5/1971 | Gehri | 225/2 |
| 4,018,372 | 4/1977 | Insolio | 225/96.5 |
| 4,046,300 | 9/1977 | Welker | 225/103 |
| 4,106,683 | 8/1978 | Grulish | 225/103 |
| 4,225,072 | 9/1980 | Reeves | 225/104 |
| 4,775,085 | 10/1988 | Ishizuka et al. | 225/103 |
| 4,420,106 | 12/1983 | Hyatt | 225/96 |

FOREIGN PATENT DOCUMENTS 742809  1/1956  United Kingdom .

*Primary Examiner*—Hien H. Phan
*Attorney, Agent, or Firm*—Michael N. Meller

[57] ABSTRACT

An apparatus for cutting a workpiece of glass, ceramic, or like material on a surface of which an incised cutting line has been formed beforehand has a backing roller made of an acrylic resin on which the workpiece is laid so that the incised line is in contact with the backing roller, a pressure applying roller with an annular pressure applying rim around its outer cylindrical surface for applying localized pressing force on the surface of the workpiece directly opposite the incised line, and a feeding mechanism for feeding the workpiece, thus pressed between the pressure applying rim and the backing roller, in the direction of the incised line, whereby the localized pressing force is applied over the entire length of the incised line. The localized pressing force creates a bending moment in the workpiece, producing a tension stress which becomes a maximum along the incised line, whereby the workpiece fractures and is thereby cut along the section in which incised line lies.

6 Claims, 2 Drawing Sheets

APPARATUS FOR CUTTING WORKPIECES OF GLASS, CERAMICS, AND LIKE MATERIAL

BACKGROUND OF THE INVENTION

This invention relates generally to the working of hard and brittle materials and more particularly to an apparatus or machine for cutting workpieces of hard materials such as glass and ceramic.

In general, a hard workpiece such as a glass or ceramic plate has heretofore been cut by a process which comprises first forming an incised line or fine groove conforming to the shape to be cut on one surface of the workpiece by means of a cutting tool such as a diamond point cutter, grasping with two hands the edges of the workpiece on opposite sides of the incised line, and applying a bending moment to the workpiece along the incised line, thereby to causing the workpiece to fracture along the incised line.

By this known cutting technique depending on directly applied bending stress, relatively thin workpieces or materials can be easily cut, but in the case of large workpieces, particularly thick plates, for example, glass plates of 15-mm thickness or more, problems such as extreme difficulty or near impossibility of the cutting operation are encountered.

SUMMARY OF THE INVENTION

In view of the above-described problems, it is an object of this invention to provide an apparatus for cutting a workpiece of glass, ceramic, or like material which is of relatively simple construction and operation, and by which even workpieces of thick dimension can be readily and rapidly cut in great quantity.

According to this invention there is provided an apparatus for cutting a workpiece as stated above on a surface of which an incised cutting line has been formed beforehand, which apparatus comprises: a frame structure; a backing member supported on the frame structure and functioning to backingly support the workpiece placed thereagainst with said surface thereof having the incised line in contact with the backing member, the backing member having a Young's modulus lower than that of the workpiece; a force applying device supported on the frame structure and being operable to apply a localized pressing force on the surface of the workpiece directly opposite the incised line; and a feeding mechanism supported on the frame structure and being operable to feed the workpiece, relative to the force applying device, in the direction of the incised line, thereby to cause the localized pressing force to be applied along the incised line on the opposite surface of the workpiece, to impart a bending moment in the workpiece along the incised line, and to cut the workpiece therealong.

BRIEF DESCRIPTION OF THE DRAWINGS

The nature, utility, and further, features of this invention will be more readily apparent from the following detailed description with respect to one preferred embodiment of the invention when read in conjunction with the accompanying drawings, wherein.

DETAILED DESCRIPTION OF THE INVENTION

The principle of cutting glass and like material according to this invention will first be described in conjunction with FIG. 1. (Reference is also made to the specification of Japanese Pat. Appln. No. 22718/1987.)

Figure 1:
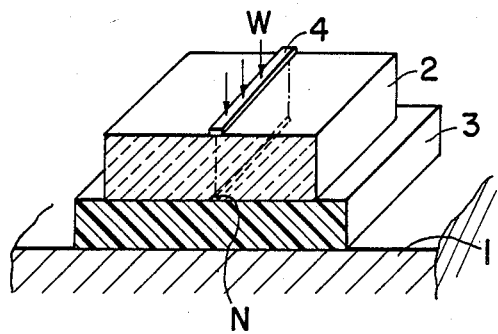
FIG. 1, is schematic perspective view depicting the principle of cutting by the apparatus of this invention.

As shown in FIG. 1, a flat plate 3 made of a synthetic resin having a Young's modulus $E_2$ which is lower, than the Young's modulus $E_1$ of a glass plate 2 to be cut is placed on a surface plate 1. Then, upon the flat plate 3, the glass plate 2 to be cut is placed.

In the cutting process, a fine groove or incised line N conforming to the intended cutting line is first formed beforehand on the lower surface of the glass plate 2 by means of a tool such as a diamond-point cutter. The glass plate is then laid on the flat plate 3 so that its surface with the incised line N will contact the upper surface of the flat plate 3.

Then, on the upper surface of the glass plate 2 thus laid, a strip-form pressure applying member 4 made of a synthetic resin is laid to follow along and above the incised line formed on the lower surface of the glass plate 2. Then a downwardly pressing load W is applied on this pressure applying member 4 by a load applying device (not shown), whereupon the glass plate 2 is cut along the incised line.

More specifically, since the flat plate 3 supporting the glass plate 2 is made of a material having a Young's modulus $E_2$ which is lower than the Young's modulus $E_1$ of the glass plate 2, when a downward load is applied to the pressure applying member 4 resting on the upper surface of the glass plate 2, the glass plate 2 is subjected to a localized compression along the incised line N. As a consequence, the flat plate 3 also is subjected to local compression, and, in the flat plate 3, the part subjected to the local compression is greatly compressed and contracts more in the thickness direction in comparison with the other parts. For this reason, a bending moment proportional to the pressing load W is generated within the glass plate 2, and the tensile stress due to this bending moment becomes a maximum at the incised line part. As a consequence, fracturing occurs in the glass plate 2 along the incised line, more precisely along the vertical sectional plane in which the incised line N lies, whereby the glass plate 2 is cut as intended.

The above-described principle of cutting glass is utilized in this invention to design and construct a practical apparatus for mechanically cutting glass and like materials, which in one example takes the form of a glass cutting machine to be described with reference to FIGS. 2 and 3.

This glass cutting machine has a frame 18 serving as a base structure for supporting the various operational parts described below by way of four support columns 19, brackets, and other structural parts. In this machine are provided a horizontal pressure applying roller 5 in place of the pressure applying member 4 in FIG. 1 and three horizontal backing rollers 6 in place of the flat plate 3. Between these mutually parallel rollers 5 and 6 is clamped a workpiece material to be cut, such as for a glass plate 7.

The pressure applying roller 5 is provided around its outer circumferential surface with a pressure applying ridge or rim 8 of annular form. This rim 8 functions to apply a pressing load in a concentrated manner on the glass plate 7, thus clamped between the rollers 5 and 6, on the surface of the glass plate 7 opposite that of the incised line N at a position immediately above line N. Thus, as the glass plate 7 is fed between and past the rollers 5 and 6, the rim 8 applies the pressing load along the upper surface of the glass plate immediately above and along the incised line N.

Each backing roller 6 is made of a hard synthetic resin having a Young's modulus $E_2$ which is lower than the Young's modulus $E_1$ of the glass plate 7 to be cut. Guide flanges 6a for preventing lateral movement of the glass plate 7 may be provided on both lateral ends of the group of backing rollers 6. The pressure applying roller 5 is made of an aluminum alloy.

The glass plate 7 is moved horizontally in the direction of the incised line N as it is supported on and by a horizontal support roller 10, contacting its lower surface on which the incised line N is formed, and horizontal guide rollers 11 at the entrance and exit ends of the path of the glass plate 7 through the machine. The support roller 10 is fixed to a horizontal feed drive shaft 12a to one end of which a feed handle 12 is fixed. The shaft 12a, which is rotatably supported on the frame structure 18, is coupled by way of a transmission mechanism comprising an endless chain 13, sprocket wheels 14, 15, other sprocket wheels, gears, and an endless chain 16 to a swinging pressing roller 17. This pressing roller 17 is rotatably supported on the distal or free end of a lever 17a which is pivotally supported at its proximal end on the shaft of the sprocket wheel 15. Thus the roller 17 is rotatably and swingably supported. By this mechanical arrangement, when the feed handle 12 is manually turned, the support roller 10 fixed to the same shaft 12a rotates, and at the same time this rotation is transmitted via the above-mentioned transmission mechanism to the pressing roller 17.

It will be obvious that, in place of the feed handle 12, a motive power means such as a motor may be used. In any case, since the support roller 10 and the pressing roller 17 are caused to rotate in mutually opposite directions, the glass plate 7, as it is clamped elastically therebetween, is progressively fed in the direction of the incised line N formed thereon. The backing rollers 6, the support roller 10, the guide rollers 11, and other rotating parts are rotatably supported by members such as brackets on the frame structure 18.

The aforedescribed pressure applying roller 5 is fixed to a horizontal spindle or arbor at an intermediate part thereof. This arbor is rotatably supported at its ends by brackets 21 and 22 fixed to a pressing head 20. This pressing head 20 is slidably supported by four upright support columns 19 which are fixedly supported at their lower ends on the frame structure 18 to form an integral structural part thereof. A horizontal clamping head 23 is fixedly supported on the upper ends of the four columns 19 and, at a part thereof vertically above the pressure applying roller 4, is screw engaged with a vertical screw shaft 24, which extends above and below the clamping head 23.

The lower end of the screw shaft 24 is adapted to be rotatably coupled to the pressing head 20, while the upper end of the screw shaft 24 fixedly supports a pressing handle 25. By turning pressing handle 25, the pressing head 20 is caused to ascend or descend. Instead of the pressing handle 25, a motor or the like can be provided to rotate the screw shaft 24. Alternatively, an actuating device such as a hydraulic cylinder can be used to apply the required force directly on the pressing head 20. Still another measure is the interposing of a ring strain gage 26 between the lower end of the screw shaft 24 and the pressing head 20 in order to measure and detect the pressing force on the pressing head 20.

In a further possible modification, the mounting positions of the backing rollers 6 and the pressure roller 5 are reversed, and, with the incised line N on the upper side of the glass plate 7, the pressing force is applied upward from below against the glass plate 7 along the incised line N.

Figure 2:
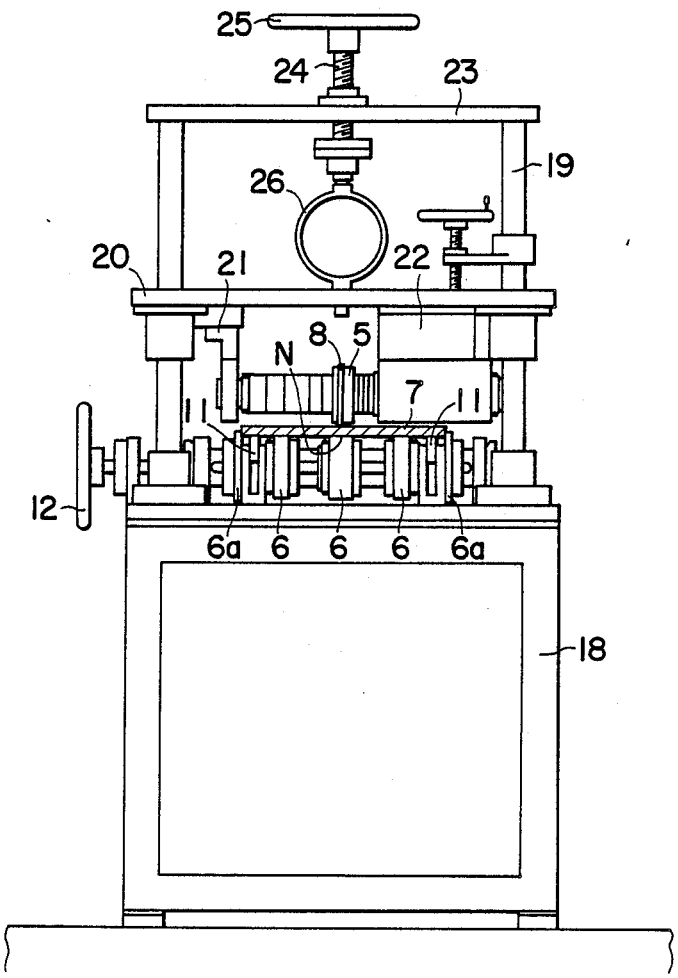
FIG. 2 is a front view of one preferred embodiment of the apparatus for cutting glass and like workpieces according to the invention.
Figure 3:
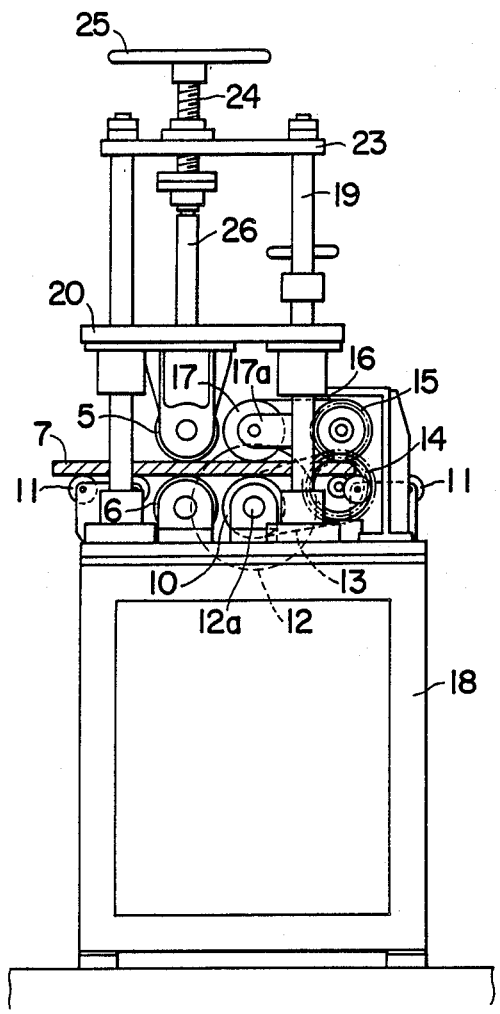
FIG. 3 is a side view of the apparatus shown in FIG. 2.

The operation of the preferred embodiment as illustrated in FIGS. 2 and 3 of the cutting apparatus according to this invention in cutting a workpiece will now be described. First, the line N is incised on one surface of the glass plate 7 to the intended dimensions, shape, and outline. The glass plate 7 thus prepared beforehand is then placed, with the incised line N on the lower side, on the backing rollers 6 and guide rollers 11. The pressure applying rim 8 of the pressure applying roller 5 is then placed on the upper surface of the glass plate 7 at a position where the rim 8 will roll relatively along the top of the incised line N.

The pressing handle 25 at the top of the machine is then turned, or a driving for the same purpose is operated, thereby lowering the pressing head 20 in sliding movement along the columns 19 and causing a localized stress to be applied via the pressure applying rim 8 to the glass plate 7 along the incised line N. The glass plate 7 is thus cut into the desired shape and dimensions.

Particularly in the case where the glass plate 7 is to be cut along a straight line as indicated in the instant example of the invention, after the pressure applying rim 8 has been pressed against the surface of the glass plate 7 over the incised line N, the feed handle 12 is turned to rotate the support roller 10. At the same time this rotation is transmitted by the aforedescribed transmission mechanism, including the sprocket wheels 14 and 15 and chains 13 and 16 to rotate the swinging pressing roller 17 in the direction opposite to that of the support roller 10. This swinging pressing roller 17 is continually urged to move downward by its own weight and by a separately imparted pressing force. Therefore the glass plate clamped between this swinging pressing roller 17 and the support roller 10 is progressively fed in the direction of the incised line N by the rotation of these rollers 17 and 10 through frictional transmission of power. As a result, the glass plate 7 is cut in a continuous manner along the incised line N.

More specifically, the backing rollers 6 for supporting and backing up the glass plate 7 are formed from a material, such as an acrylic resin, whose Young's modulus $E_2$ (for example, $E_2 \approx 340$ kgF/mm$^2$) is less than the Young's modulus $E_1$ (for example, $E_1 \approx 7,000$ kgF/mm$^2$) of the glass plate 7. For this reason, when a downward pressing force is applied on the pressure applying roller 5 placed on the upper surface of the glass plate 7, the glass plate 7 is subjected to a concentrated and localized compressive force exerted by the pressure applying rim 8 along the incised line N. Accordingly, the backing roller 6 of the above described character immediately below the pressure applying roller 5 is also subjected to a localized compressive force, and the part of this roller 6 subjected to this localized compressive force is compressed to a greater extent than the other parts of the roller 6. As a consequence, a bending moment proportional to the pressing load develops within the glass plate 7 and gives rise to a tensile stress on the lower side, which stress reaches a maximum value along the incised line N. Consequently, the glass plate 7 fractures along the previously formed incised line N, and continuous cutting of the glass plate is accomplished.

Particularly, even thick workpieces (e.g., 20 to 40 mm thick) such as glass plates which could not be cut by a simple bending process as conventionally practiced heretofore, can be readily cut by appropriately increasing the pressing load. For example, in the case of a glass plate of a thickness of 40 mm, a pressing load W of approximately 1,040 kgF is sufficient.

As has been described above, in accordance with this invention, a pressing force is applied by a manually operated mechanism or a driving device on a workpiece provided beforehand with an incised line to serve as a cutting line and laid on one or more backing rollers, the pressing force being thus applied in a concentrated and localized manner along the incised line thereby to induce mechanically and continuously within the workpiece a bending movement proportional to the pressing force as a consequence of a difference between the Young's moduli of the materials respectively of the workpiece and the backing rollers. Particularly according to this invention, a novel principle wherein the tensile stress within the workpiece due to the bending moment becomes a maximum along the incised part is utilized, whereby cutting of thick workpieces, which could not be cut by a simple bending process in the prior art, can be easily accomplished.

Furthermore, since this cutting by the apparatus of this invention can be carried out mechanically and continuously, no noise is generated and no chips or dust are produced due to the cutting, and moreover, the cut surfaces can be made to have a mirror finish. Another desirable feature is that, since the cutting is performed mechanically, there is little danger with respect to the operator of the apparatus, and quantity (mass) production becomes possible.

Still another desirable feature of the instant apparatus is that it is not limited to straight-line cutting, but, by changing the feeding direction of the glass plate, a thick rectangular plate can be cut diagonally to produce prisms. Furthermore, by the use of the apparatus of this invention, it is possible to cut not only planar workpieces but also workpieces having curved surfaces and/or relatively complex outlines.

What is claimed is:

1. An apparatus for cutting a workpiece of glass, ceramic, or like material on a surface of which an incised line has been formed beforehand along an intended cutting line, said apparatus comprising:
    a rigid frame structure;
    a backing member supported on said frame structure and functioning to backingly support said workpiece placed thereagainst with said incised line in contact with said backing member, said backing member having a Young's modulus lower than that of the workpiece;
    a force applying device supported on the frame structure and operable to apply a localized pressing force on the surface of the workpiece opposite said surface having said incised line at a position directly opposite the point at which said backing member supports said workpiece; and
    a feeding mechanism supported on the frame structure and being operable to feed the workpiece, relative to said force applying device, in the direction of the incised line, thereby causing said localized pressing force to be applied along a line parallel to the incised line on said opposite surface of the workpiece, to impart a bending moment to the workpiece in the region thereof around the incised line, and thereby fracturing and cutting the workpiece along a section thereof in which the incised line lies.

2. An apparatus as claimed in claim 1, in which said force applying device comprises a pressing head so supported and guided by a part of said frame structure as to be movable toward and away from the workpiece thus placed against the backing member, a pressure applying roller rotatably supported by said pressing head and having around the outer circumferential surface thereof an annular pressure applying rim for applying said localized pressing force, and a force exerting device supported on the frame structure and being operable to exert a force on said pressing head in either of two directions respectively for forcibly moving said pressing head toward the workpiece and for retracting the pressing head away from the workpiece.

3. An apparatus as claimed in claim 2, in which said backing member comprises a plurality of coaxial backing rollers rotatably supported on the frame structure and having an axis of rotation parallel to the axis of rotation of said pressure applying roller.

4. An apparatus as claimed in claim 1, in which said feeding mechanism comprises a support roller fixed coaxially to a feed drive shaft and positioned to contact one surface of the workpiece, the axis of said support roller being perpendicular to said direction of said incised line, said feed drive shaft being rotatably supported on said frame structure, a pressing roller rotatably supported in a manner to be pressed against the surface of the workpiece directly opposite said one surface thereof in contact with said support roller, and a rotational power transmitting mechanism for transmitting the rotation of said feed drive shaft to said pressing roller to cause the support roller and the pressing roller to rotate in synchronism at the same tangential speed but in opposite rotational directions.

5. An apparatus as claimed in claim 3, in which the backing rollers are made of an acrylic resin.

6. An apparatus as claimed in claim 2, in which said pressure applying roller is made of an aluminum alloy.

* * * * *